Oct. 19, 1948.   H. D. OAKLEY   2,451,863
APPARATUS FOR BALANCING ROTORS
Filed May 23, 1945                                    2 Sheets-Sheet 1
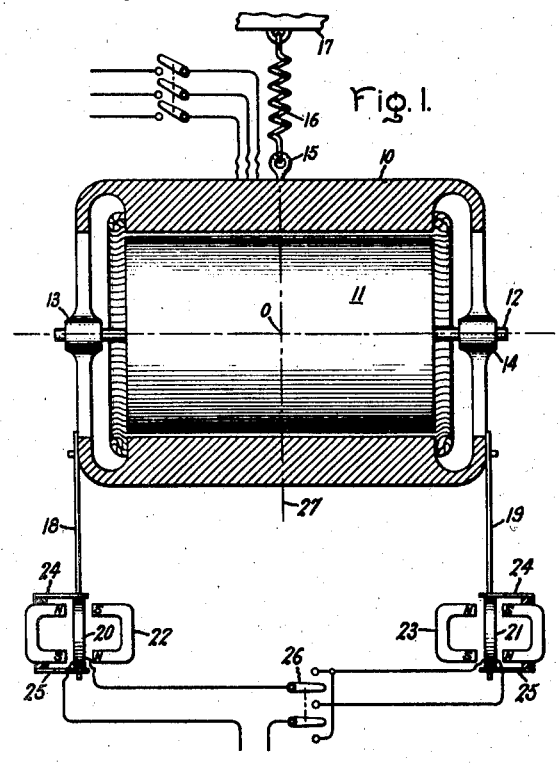
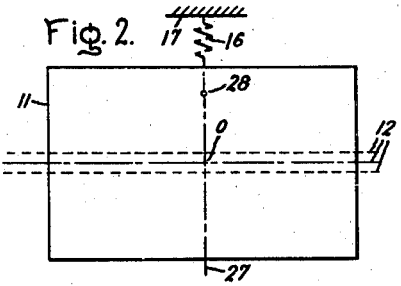
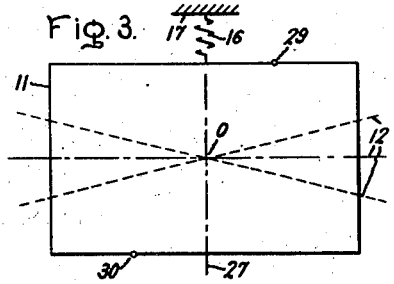
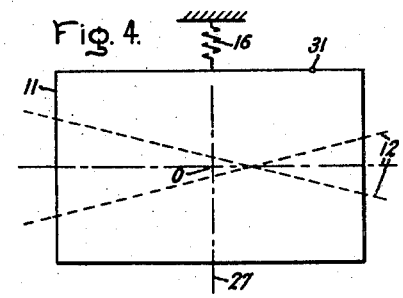
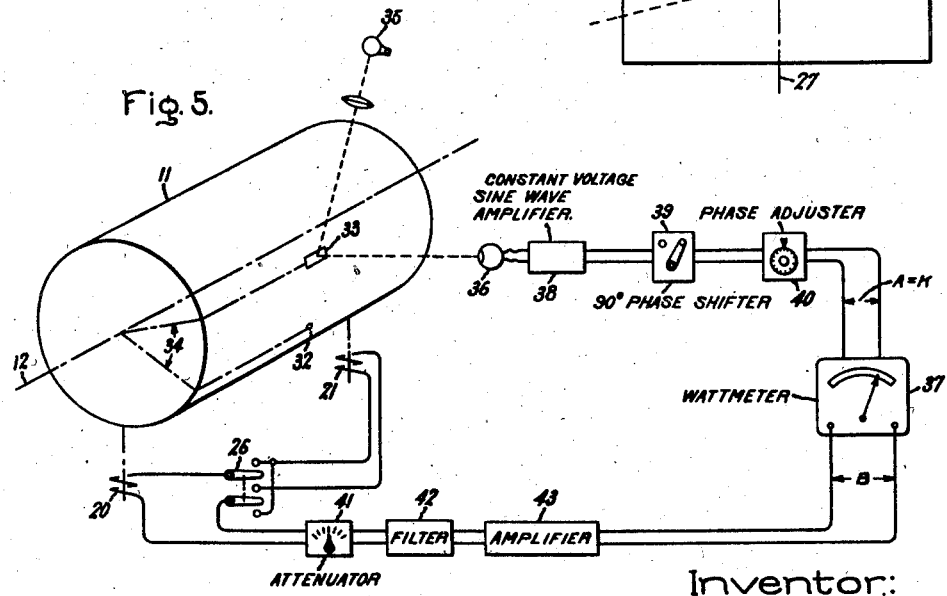
Inventor:
Henry D. Oakley,
by Harry E. Dunham
His Attorney.

Oct. 19, 1948.  H. D. OAKLEY  2,451,863
APPARATUS FOR BALANCING ROTORS
Filed May 23, 1945  2 Sheets-Sheet 2
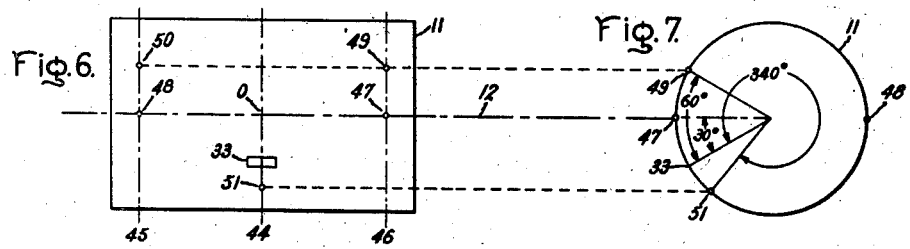
Inventor:
Henry D. Oakley,
by Harry E. Dunham
His Attorney.

Patented Oct. 19, 1948

2,451,863

UNITED STATES PATENT OFFICE 2,451,863

APPARATUS FOR BALANCING ROTORS

Henry D. Oakley, Schenectady, N. Y., assignor to General Electric Company, a corporation of New York Application May 23, 1945, Serial No. 595,351

2 Claims. (Cl. 73—66)

My invention relates to a method and apparatus for balancing rotary elements, particularly small, high speed rotor elements such as are used in gyroscopic instruments. My invention meets the following desirable conditions. There is no physical connection, and hence, no restraint to the rotor being tested for unbalance, exceedingly small amounts of unbalance are detected both as to position and magnitude, and the apparatus and method of use are such as not to require a highly skilled operator. In carrying my invention into effect, I suspend the gyroscope or other apparatus whose rotor is to be balanced so that its stator or framework has freedom of movement. The rotor thereof is then set into operation. If, now, the rotor is unbalanced, such unbalance results in measurable motion of the free-to-move stator element thereof. The unbalancing forces causing such motion can be reduced to a force and a couple, and the values of these determined from a study of the extent and the nature of the movement of the stator. The movements of the stator caused by rotor unbalance have a cyclic relation with respect to the speed of rotation of the rotor, and a study of these relations with respect to a reference point on the rotor reveals the points of application of the unbalancing forces on the rotor, so that the positions on the rotor where weight is to be added or removed to effect a balance can be located. Suitable instrument devices are employed for measuring and combining the data in an automatic manner and indicating the results in terms of the amount and location of the weight to be added to or removed from the rotor to bring the same into balance.

The features of my invention which are believed to be novel and patentable will be pointed out in the claims appended hereto. For a better understanding of my invention, reference is made in the following description to the accompanying drawings in which Fig. 1 represents a machine such as an electric motor arranged in a fixture for obtaining data pertaining to the condition of unbalance. Figs. 2, 3, and 4 are diagrammatic representations of a rotor to which reference will be made to explain the different kinds of unbalance usually encountered. Fig. 5 is a schematic representation of a system for measuring the magnitude of the unbalancing components and determining the angular positions of such components relative to a reference point on the rotor. Figs. 6 and 7 represent side and end views of a rotor to which reference will be made in explaining how the data obtained by the apparatus of Fig. 5 may be used to balance the rotor.

Referring to Fig. 1, 10 represents the stator framework and 11 the rotor of a gyroscope device or other apparatus, the rotor of which is to be balanced. The rotor is mounted for rotation in the stator on the axis 12 in bearings indicated at 13 and 14. The gyroscope is represented as being in the form of an electric motor. However, this is not essential. The rotor may be driven by an air blast, for example. The gyroscope is suspended from a hook at 15 by a spring 16 to a stationary support at 17 so as to allow the apparatus freedom of movement or, at least, such freedom of movement as is necessary for the purposes of my invention. In order to study the motion, if any, of the stator for the purposes of my invention, it is provided with light flexible rods 18 and 19 near its bottom ends which extend downward and carry pickoff coils 20 and 21 at their lower ends. These coils extend between the pole pieces of stationary permanent magnet assemblies 22 and 23 polarized as indicated and in order to maintain the proper air gap relation when movement of stator 10 occurs, the coils are also suspended from the stationary magnet structures by leaf springs as at 24 and 25. The stator is of course suspended so as to be balanced in the position shown in this case, with all of its weight suspended by spring 16. The center of gravity of the entire machine is represented at O and the line 27 a plane passing through the center of gravity and point of suspension equally distant from the pickup coils 20 and 21. The nature of the mounting is such that the stator may rise and fall as well as tip about axes perpendicular to the drawing to the limited extent necessary for the purposes of my invention without such restraint as will defeat the purpose of such mounting. The pickup coil arrangement is designed to offer no restraint to the movement to be studied. I do not confine my invention to the particular form of mounting shown or to the particular way indicated of detecting the movement of the stator. To avoid excessive movement of the stator, such as might occur during a motor starting operation, and which might damage the delicate pickup coil connections, suitable stops, not shown, adjacent the stator may be provided. The coils 20 and 21 are connected by flexible leads to a reversing switch 26, so that they may be connected in series in boosting or bucking relation and the resultant voltage utilized for the purposes of my invention.

To explain the operation of the balancing fixture of Fig. 1, assume first that the rotor is perfectly balanced. In such a case when the rotor is up to speed, there will be no movement of the stator and no voltage generated in the pickup coils 20 and 21. Next assume that the rotor is unbalanced and that the point of unbalance lies on the vertical axis 27 passing through the center of gravity O and point of support at 15. Thus assume the point of unbalance is at 28 (Fig. 2) with the rotor stationary. Such point of unbalance may be visualized as extra weight located at such point. Figs. 2, 3, and 4 are schematic and the rectangle may represent the rotor. When the rotor is set into rotation, the unbalance will cause a rotating radial force to appear whose line of action passes through the center at O, resulting in an up-and-down movement of the stator as a whole as represented by displaced dotted line positions of the horizontal axis 12, Fig. 2. This up-and-down movement is at a frequency corresponding to the speed of the rotor and generates equal alternating current voltages $e_{20}$ and $e_{21}$ in the coils 20 and 21 (Fig. 1). The resultant voltage will therefore be the sum of these voltages when the coils are connected to add with the reversing switch closed to the left, and zero when the switch is closed to the right. In the latter case the voltages are 180 degrees out of phase and hence cancel each other. Thus by noting the voltage from the coils 20 and 21 for the two switch positions, we know that the rotor is unbalanced, that such unbalance lies on the central axis 27 or is a "force" unbalance, and we have a measure of the magnitude thereof. Assume now that the point of rotor unbalance is at point 29, Fig. 3, to the right of the central axis 27 and that an identical amount of unbalance is at point 30, 180 degrees from point 29 and an equal distance from the central vertical axis to the left. In this case when the rotor rotates, the gyro will tip about the center point O as represented by the dotted line positions of normally horizontal axis 12. Again equal voltages will be generated in coils 20 and 21 but now they will be 180 degrees out of phase with the switch 26 in the left or previous boosting position and will cancel. They will be in phase and will add with the switch 26 thrown to the right. Thus bearing in mind the position of switch 26, the voltage indications tell us the nature of the unbalance and the relative magnitude thereof. This is termed a "couple" unbalance. That is, the rotor is equally unbalanced on opposite sides of the vertical central axis and at points 180 degrees apart by an amount proportional to the voltage obtained with the switch 26 thrown to the right.

In practice it is rare that the condition of Fig. 2 or the condition of Fig. 3 will exist singly. It is usual for both of these conditions to exist simultaneously as represented in Fig. 4, where it is assumed that the point of unbalance is at point 31. When the rotor rotates, the unbalance of Fig. 4 produces a vertical displacement of the center of gravity point O and also a rocking motion of the horizontal axis 12, thus causing the conditions of Fig. 2 and 3 to coexist. However, the coexistence of both conditions can be detected by the nature of the voltage measurements. Voltage $e_{20}$ will be greater than $e_{21}$ in this case. When the switch 26 is in the boosting position to the left, the resultant voltage will be proportional to the vertical displacement of the center of gravity of the machine and independent of the tipping action, and with switch 26 thrown to the right the resultant voltage will be proportional to the tipping or rocking movement and independent of the vertical displacement. Thus I have provided relatively simple means for measuring the unbalance in terms of a force (vertical displacement) of the machine as a whole, and a couple (tipping action). The magnitudes of displacement represented by the dotted lines in Figs. 2 to 4 have been considerably exaggerated over that which will usually occur in practice. The calibration of the apparatus is simplified if the horizontal distances from the center line 27 to the pickup coils 20 and 21 are made equal.

The determination of magnitudes of unbalance as above described does not give sufficient information to balance the rotor, since the peripheral position of unbalance on the rotor must also be determined and can be determined as will now be explained. Fig. 5 represents a perspective view of the rotor and it is assumed that a position of an unbalanced condition is at point 32. It is evident that this point of unbalance could be at any position about the periphery in a plane perpendicular to the axis of rotation and exert the same force when the rotor is rotated. Thus to correct for such unbalance, the peripheral position of the point of unbalance on the rotor must be determined as well as its magnitude. Suppose now a mirror surface 33 is arbitrarily located on the rotor periphery as a point of reference and that in some way the angle 34 between point 32 and mirror 33 is measured. Then a means exists whereby it is possible to determine where, about the rotor periphery, point 32 is located. The ability to measure the angle 34 from a known point 33 and to determine the nature and magnitude of the unbalance at 32 enables one to determine all of the data necessary to balance the rotor. It is not practicable to actually mount a mirror on the surface of the rotor at 33, as this would of itself change the balance and, moreover, would likely be thrown off by centrifugal force. Hence the spot 33 is merely some spot on the rotor surface which is of sufficiently contrasting color or brightness to the remainder of the surface to be used as a reference point in a photoelectric cell light beam detecting system. For example, on a rotor with an unpolished surface it may consist of a polished section. On a rotor with a polished surface it may consist of a patch of dark paint. Light is focused on the rotor surface from a light source 35 and reflected into a photocell 36. This light contrasting surface patch may be either on the end or periphery of the rotor as convenience dictates. Thus with this arrangement with the rotor is rotating, an electric impulse is generated by the cell once per revolution and the phase angle between this impulse and the properly selected summation voltage impulse of the same frequency generated by the pickup coils 20 and 21, Fig. 1, may be measured to locate the unbalanced position 32. For the method of calibration to be described such phase angle corresponds to the angle 34, Fig. 5. Thus I have provided an inexpensive balancing fixture or arrangement whereby without making contact with the rotor and without requiring modification of the machine under test, measurements are obtained from which the amount and rotor location of any unbalanced condition may be ascertained and corrected. In Fig. 5 I provide an electrical system into which the unbalance measurement voltage impulses are received for interpreting the measurements in terms of the amounts and positions of material to be removed from the surface of the rotor to produce a balance.

A suitable electrical system for this purpose and its connection to the voltages obtained from the balancing fixture are represented in outline in Fig. 5, from which it will appear that the voltages representing unbalance magnitude from the coils 20 and 21 and the voltage representing the location of unbalance from photocell 36 are after suitable modification fed to a wattmeter device 37. An alternating current wattmeter gives indications proportional to the product of two quantities and the cosine of the angle between them. Thus if A and B represent two alternating current quantities of the same frequency and $\phi$ the phase angle between them, the wattmeter indication will be proportional to $AB \cos \phi$. Applying this to Fig. 5, let B represent an alternating current voltage fed to the wattmeter which is proportional to the magnitude of unbalance and which is derived from coils 20 and 21. Let A represent an alternating current voltage of the same frequency as B, and which for my purposes is held constant, and which is derived from the photocell 36 and has a phase angle $\phi$ relative to voltage B representative of the angular position of the unbalance from point 33 on the rotor under test. The wattmeter deflection D may thus be written $D = KB \cos \phi$ where K is a constant. The voltage A may be made constant by employing a suitable amplifier converter at 38 which converts the impulses produced by the photocell 36 into a sine wave alternating current voltage of constant value.

In the equation $D = KB \cos \phi$, there are of course an infinite number of sets of values for B and $\cos \phi$ which will give the same wattmeter deflection. We are here interested in knowing the values of B and $\cos \phi$ individually and not their product. The way out of this difficulty is explained as follows: Suppose we could always assign the value zero to $\cos \phi$, then no matter what the value of B became, D would always be zero. I do just this as will be explained later. Again suppose the value of $\cos \phi$ could always be made equal to unity, then D would always be proportional to KB and since K is a constant whose value can be determined, the magnitude of D can thus be made to represent the magnitude of the unbalance.

Provision is made by a 90-degree phase shifter device 39 and by a phase adjusting device 40 for shifting the phase of the position responsive voltage A in order to make $\cos \phi$ either zero or unity. The magnitude voltage as it comes from the pickup coils 20 and 21 may vary over a ratio of 1000 to 1, the lower limit being the voltage when the unbalance has been reduced to the desired value or when the machine may be said to be in perfect balance. This range of voltage is too large to be handled satisfactorily by the succeeding elements of the system, so that I provide a voltage attenuator 41 to reduce the higher voltages by known ratios to suitable values. The output of the pickup coils contains other voltages not generated directly by the unbalance such as may be due to roughness in the bearings or irregular torque in the machine under test, and when the rotor of such machine is in fairly good balance, the magnitude of these other voltages may exceed that due to unbalance. If these extraneous voltages are allowed to pass on through the system, the results would be unsatisfactory and to avoid this, they are filtered out by filter apparatus 42 and only the voltage due to unbalance is allowed to pass through. The voltage output from the filter may be too low for the wattmeter and hence it is amplified as desired by an amplifier 43 and then supplied to the wattmeter.

The apparatus is operated as follows: The rotor under test is brought up to speed. Switch 26 is closed to the left for the unbalance force measurement. Wattmeter 37 reads something but assume it is too high or too low. Attenuator 41 is adjusted to obtain a convenient wattmeter reading. Now the knob of the phase adjuster 40 is turned until a maximum wattmeter reading is obtained. If the maximum lies offscale, attenuator 41 is readjusted to bring the maximum wattmeter reading back on the scale. With the phase adjuster adjusted to obtain a maximum wattmeter reading, we know that the A and B voltages applied thereto are in phase, $\phi$ is zero and $\cos \phi$, as applied at the wattmeter, is unity. Hence, our equation $D = KB \cos \phi$ becomes $D = KB$. Therefore, the reading of the wattmeter multiplied by the existing adjustment ratio of the attenuator 41 gives us a value for the magnitude of the unbalance force measurement. Now we turn the phase adjuster 40 until the wattmeter reads zero. The phase adjuster is provided with a scale and is otherwise adjusted so as to read the angle between the reference reflecting spot 32 on the rotor and the position of rotor unbalance such as point 32, Fig. 5, when the phase angle $\phi$ between the voltages applied to the wattmeter is 90 degrees. Such adjustment must take into consideration the angle, if any, between the position of the pickup coils and the position of the reference spot 33 at the instant a photoelectric impulse is generated, and the direction of rotation of the rotor. Thus with the wattmeter reading adjusted to zero as above described, the scale of the phase adjuster indicates the angle between the reference point 33 and the point of force unbalance 32.

The operation is repeated with the reversing switch 26 thrown to the right to measure the magnitude and location of any couple or tipping component of unbalance that may exist.

In the operation as above described the question may arise as to why use two settings of the phase adjuster 40? Why not adjust the phase for the maximum reading of the wattmeter and then use the reading of the phase shifter as the position angle? This is possible but much less accurate because in the region of $\cos \phi = 1$, the value of the cosine values varies slowly so that a careless setting of the phase shifter, while not seriously affecting the data so far as determining a magnitude is concerned, can result in a large error in evaluating the position angle. For instance, when $\phi = 0$, $\cos \phi = 1$ and when $\phi = 20$ degrees, $\cos \phi = .94$, so that an error of 20% in setting the phase shifter results in only a 6% error in magnitude, but an error of 20% in the position angle value would be serious. In the region where $\cos \phi = 0$, any slight deviation from the zero causes an immediate displacement of the wattmeter deflection from its zero position so that, here, the determination of the position angle is precise.

I may, however, avoid a double setting of the phase shifter, obtain the precise position angle measurement, and, moreover, avoid the possibility of making a 180-degree error in the position angle by the use of the phase shifter 39 which has a two-position switch corresponding to phase shifts which are exactly 90 degrees apart.

In the procedure above described where a double setting of the phase adjuster 40 was used, the two settings were 90 degrees apart. The phase shifter 39 may be used to advantage for accomplishing such 90-degree phase shift and when so used, the procedure is as follows: The switch of 39 is first moved to shift the phase 90 degrees from that previously used and the phase adjuster 40 is adjusted until the wattmeter deflection is zero. The phase shifter 39 is then returned to its original zero phase shift position so that the wattmeter reading increases to a maximum. Now the reading of the phase adjuster 40 indicates the position angle, and the wattmeter reading multiplied by the reading of the attenuator 41 gives the magnitude measurement of the unbalance. The use of 39 not only avoids a double setting of 40 but also removes an ambiguity. This is because there are two positions of 40, 180 degrees apart at which the wattmeter will read zero so that when using a double setting of 40, it is possible to get a reading of the position angle which is in error by 180 degrees. When, however, 39 is used and 40 is set in the wrong direction, the wattmeter will indicate off the zero end of the scale instead of reading upscale when the 90-degree shift is made, thus immediately giving warning of the incorrect "180-degree off" setting of 40.

It is of course necessary that the phase shifter dial be correctly calibrated with the apparatus initially, which may be done as follows: A well balanced rotor is placed in the fixture and deliberately unbalanced by fixing a small known weight unit thereto at the reference spot 33. The unbalance angle position is thus definitely located at zero angle. The machine is brought up to speed, the phase shifter 39 turned to the 90-degree phase shift position, and the phase adjuster 40 adjusted until the wattmeter reads zero. Then maintaining such adjustment, the scale or the pointer of the phase adjuster 40 is loosened and turned until a zero angle indication thereof is obtained and then refastened. At the same time the direction of rotation of the rotor is noted and trials and tests are made by shifting the weight in a known direction from the reference point and noting the direction of shift of the pointer of the phase shifter for correct location, and suitable instructions are then made out accordingly, so that no mistakes in the direction of location from the reference point can be made if the instructions are followed.

The deliberate unbalancing of the rotor by a known weight unit, say, of one gram also give a definite maximum reading of the wattmeter which may be considered as the unbalance unit corresponding to such weight, which establishes a calibration relation between the wattmeter reading and weight unit unbalance for that particular type, size, and speed of machine. This indicates a procedure that may be used in calibrating the apparatus. For couple measurement calibrations the known unbalancing weight or weights are placed on the otherwise perfectly balanced rotor in correction planes located a definite distance from the center of gravity O of the machine measured in the axial direction.

I will now explain in connection with Figs. 6 and 7 how to use the measurements obtained for balancing a rotor. Assume that the rotor of Figs. 6 and 7 has been tested for balance as previously described and we have obtained the following data:

Couple unbalance_ 30 degrees, magnitude 6 units
Force unbalance_ 60 degrees, magnitude 10 units The magnitude data take into consideration previous calibration and multiplication of the wattmeter reading with the proper ratio factor used at the attenuator 41. Correction planes 44, 45, and 46, Fig. 6, have been established, correction plane 44 being through the center of gravity position O, and correction planes 45 and 46 equally distant from and on opposite sides of plane 44; such planes being located as convenience dictates, preferably near the ends of the rotor where the least amount of material will need to be removed for couple balance, and the effect of placing weights of known value in these planes having been established in the calibration of the apparatus. Measuring 30 degrees from reference point 33 in the proper direction, also established by calibration of the apparatus, we find a point 47 in plane 46 and a point 48, 180 degrees from point 47 in plane 45. Now, if we drill out material and the amount of material drilled out at each such point is equal to or corresponds to the three units of unbalance, the couple component of unbalance will disappear. Next, we measure 60 degrees from reference point 33 in planes 45, and 46, locating points 49 and 50 and at each such point drill out material equal to five units unbalance in each plane. The force component of the unbalance disappears and the rotor is completely balanced.

In the above procedure the two types of unbalance are divided into two equal parts and four drillings are necessary. An equivalent procedure involving less drilling may be used as follows: Drill out the whole six units of the couple unbalance at point 47 in plane 46. The couple unbalance disappears but an additional force component appears which previously did not exist, and hence, the data previously obtained as to the force component are no longer correct. The new force component may now be measured and its position located by a new test. It is the vector sum of the original force component of the unbalance and the additional force appearing when metal is drilled out to remove the couple unbalance. Suppose the new force data are 340 degrees and eight units. We thus locate point 51 340 degrees from 33 in central plane 44 and drill out the eight units of force unbalance. Since this drilling is in the center of gravity plane 44, it produces no couple unbalance, and hence, the rotor is completely balanced using only two instead of four drillings. Instead of removing material to effect a balance material may be added, but on the opposite side or end of the rotor.

If the apparatus is properly calibrated and the data correctly taken, the balancing procedure is highly accurate and exact and involves no guesswork or tedious cut-and-dry procedure.

What I claim as new and desire to secure by Letters Patent of the United States is:

1. In rotor balancing apparatus for use with a framework having bearing means for centrally rotatably supporting a rotor member to be balanced, means including a universal joint type of connection for resiliently suspending said framework from a point above the center of gravity of the combined framework and rotor member with the axis of rotation thereof horizontal to permit the framework to have freedom of movement in response to any unbalance of the rotor when the latter is rotating, such rotor unbalance producing a vibratory bodily movement of the framework or a vibratory tipping movement of the framework in a vertical plane passing through the axis of rotation or a combination of such movements depending upon the nature of the rotor unbalance and at a frequency corresponding to the speed of rotation of the rotor member, a pair of means including movable parts secured to said framework for producing alternating current voltages of a frequency corresponding to the speed of rotation and respectively proportional to the vertical movements of the framework at points equally distant horizontally from the point of suspension measured along the axis of rotation, and a circuit including a reversing switch for connecting said voltage producing means in series to obtain a summation voltage which is proportional to the vertical bodily movement of said framework when the reversing switch is in one position and is proportional to the tipping movement of said framework when the reversing switch is in a reverse position.

2. Apparatus for determining the condition of unbalance, if any, of a rotary member comprising in combination with such rotary member, a rigid framework having a pair of bearings spaced apart and rigidly secured in said framework for rotatively supporting the rotary member on an axis of rotation which is fixed relative to said framework, resilient means for supporting said framework permitting universal limited bodily movement thereof, whereby if the rotor member is unbalanced rotation thereof in said framework will cause the framework and rotor to vibrate in unison with a circular component of vibration in accordance with the extent and axial location of such rotor unbalance and at a frequency corresponding to the speed of rotation, a pair of electromagnetic means each having a movable part secured to said framework substantially equally distant from the center of gravity of said framework and rotor combined and measured along the axis of rotation for producing alternating current voltages in phase with and proportional to the vibratory movements of the framework at such points in a given direction perpendicular to the axis of rotation, circuit means including a reversing switch for connecting said electromagnetic means in series in boosting or bucking relation to obtain summation alternating current voltages, means including a member driven synchronously with said rotor for producing a constant alternating voltage of the same frequency as that produced by said electromagnetic means and having a known phase relation with respect to a reference point on the rotor member, electrical measuring means responsive to said summation voltages and to said constant voltage and to their phase relations, and means for adjusting the phase relation of one of the voltages supplied to said measurement means and indicating the extent of such adjustment, said measuring and phase adjusting means being calibrated to indicate the magnitude and the axial and angular location of any unbalanced condition of such rotor member.

HENRY D. OAKLEY.

REFERENCES CITED

The following references are of record in the file of this patent:

UNITED STATES PATENTS

| Number | Name | Date |
|---|---|---|
| 110,259 | Martinson | Dec. 20, 1870 |
| 922,561 | Callan | May 25, 1909 |
| 953,811 | Bassett | Apr. 5, 1910 |
| 1,599,922 | Rathbone | Sept. 12, 1924 |
| 2,131,602 | Thearle | Sept. 27, 1938 |
| 2,165,992 | Westendorp | July 11, 1939 |
| 2,167,488 | Ohlson | July 25, 1939 |
| 2,177,830 | Janeway | Oct. 31, 1939 |
| 2,243,379 | Johnson | May 27, 1941 |
| 2,243,458 | Esval et al. | May 27, 1941 |
| 2,348,922 | Pekar | May 16, 1944 |
| 2,363,373 | Werner | Nov. 21, 1944 |
| 2,382,843 | Annis | Aug. 14, 1945 |
| 2,383,588 | Bousky | Aug. 28, 1945 |

FOREIGN PATENTS

| Number | Country | Date |
|---|---|---|
| 401,569 | Great Britain | Nov. 16, 1933 |
| 531,152 | France | Oct. 17, 1921 |
| 611,291 | France | July 3, 1926 |